United States Patent [19]

Morishita et al.

[11] Patent Number: 4,517,564

[45] Date of Patent: May 14, 1985

[54] CORDLESS REMOTE CONTROL APPARATUS

[75] Inventors: Tatsuo Morishita; Fumio Funakoshi, both of Yokohama; Kenichi Nakamura, Sagamihara; Kazuo Takamori, Yokohama, all of Japan

[73] Assignee: Tokyo Shibaura Denki Kabushiki Kaisha, Kawasaki, Japan

[21] Appl. No.: 418,542

[22] Filed: Sep. 15, 1982

[30] Foreign Application Priority Data

Sep. 21, 1981 [JP] Japan ............................... 56-148993

[51] Int. Cl.$^3$ .......................... H04Q 9/00; H04B 1/06

[52] U.S. Cl. ............................ 340/825.69; 358/194.1; 340/696; 455/151

[58] Field of Search ....................... 340/825.44, 825.69, 340/696, 825.17; 367/197–199; 455/68, 88, 4, 5, 151; 358/194.1

[56] References Cited

U.S. PATENT DOCUMENTS

| | | | |
|---|---|---|---|
| 3,406,342 | 10/1968 | Hubner . | |
| 3,696,384 | 10/1972 | Lester | 367/199 |
| 4,291,411 | 9/1981 | Muller et al. | 455/151 |
| 4,322,855 | 3/1982 | Mogi et al. | 358/194.1 |
| 4,336,524 | 6/1982 | Levine | 340/825.44 |

FOREIGN PATENT DOCUMENTS

| | | |
|---|---|---|
| 2542021 | 3/1977 | Denmark . |
| 0005256 | 11/1979 | European Pat. Off. . |
| 2005114 | 4/1979 | United Kingdom . |
| 2013947 | 8/1979 | United Kingdom . |

*Primary Examiner*—Donald J. Yusko
*Attorney, Agent, or Firm*—Cushman, Darby and Cushman

[57] ABSTRACT

A cordless remote control apparatus has a controlled portion adapted to a main body and a control unit cordlessly or wirelessly coupled to the controlled portion. The control unit contains an instruction transmitter for generating an instruction wave. The main body contains a device which is actuated according to the instruction wave wirelessly transmitted from the control unit to the controlled portion. The controlled portion includes an instruction receiver for generating a receiving indication signal when the instruction receiver is coupled to the instruction transmitter via the instruction wave, and providing the device with a control command corresponding to the contents of the instruction wave. The control command determines the actuation of the device. The controlled portion further includes a confirmation transmitter coupled to the instruction receiver for generating a confirmation wave for a given period of time after the receiving indication signal disappears and control command is generated. The control unit includes a confirmation receiver cordlessly or wirelessly coupled to the confirmation transmitter via the confirmation wave for indicating in accordance with the confirmation wave the establishment of actuation of the device.

21 Claims, 14 Drawing Figures

CORDLESS REMOTE CONTROL APPARATUS

BACKGROUND OF THE INVENTION

This invention relates to a cordless remote control apparatus being adapted to an electric device such as a video recording/reproducing system, a TV system, an audio system and the like.

Remote control apparatus are widely utilized in electric devices for serving the convenience of users. Particularly a cordless or wireless type remote control apparatus is warmly received as a matter of practical convenience, since it does not require a hampering wire clinging thereto. In general a cordless remote control apparatus comprises a remotely controlled portion being mounted on a main body and a handy size remote control unit. The control unit communicates with the controlled portion via a data transmission medium not requiring a physical connection; such as, for example, a radio wave, infrared ray or a ultransonic wave. Then, a user can remotely control the actuation of main body by the manipulation of control unit. For instance, by means of such remote control apparatus, the user may instruct the playback start of a disc player and adjust the reproducing loudness without touching the player system of main body.

Athough a cordless type remote control apparatus is more convenient for a user than a wired type, a problem arises in the use of the cordless system. That is, the reliability of data communication between the control unit and the controlled portion in a cordless system is somewhat less than that of a wired system. This is because, in a cordless system, control instructions being transmitted from the control unit to the controlled portion are liable to be weakened in its magnitude, subjected to undesirable modifications by external noises, etc, and/or retarded by any body interrupting the transmission path of control instructions.

SUMMARY OF THE INVENTION

It is accordingly the object of the present invention to provide a cordless remote control apparatus in which the reliability of remote control is improved.

To achieve the above object the cordless remote control apparatus of the invention has a controlled portion and a control unit cordlessly or wirelessly coupled to the controlled portion. The controlled portion includes means for generating a confirmation wave which indicates that a given actuation instructed by the control unit is established. The confirmation wave is cordlessly or wirelessly transmitted to the control unit. The control unit includes means for indicating the establishment of said given actuation upon receipt of the confirmation wave. Thus, the manipulator of the control unit can always monitor whether or not the remote control is exactly established, resulting that no erroneous remote control operation is carried out, and the reliability of remote control is significantly improved.

Now, assume here that the control unit transmits to the controlled portion an instruction wave being formed of an electromagnetic or sonic wave, and the controlled portion transmits to the control unit a confirmation wave being formed of the same kind of wave as that of the instruction wave. In this case, if the confirmation wave is generated during the transmission of instruction wave, there is a certain possibility that the confirmation wave interferes or disturbs the instruction wave so that the instruction wave is considerably weakened or that contents of instruction wave is erroneously modified.

To solve the above problem the controlled portion may include means for generating the confirmation wave only during a given period of time after the remote control is completely established. When such means is used, the interference caused between the instruction wave and the confirmation wave can be avoided.

Further, the control unit may include means for prohibiting transmission of the instruction wave where the confirmation wave is received, so that the instruction wave and the confirmation wave are never provided simultaneously, thereby avoiding said interference of waves.

Still further, in order to avoid an erroneous indication of confirmation due to said interference of waves, the control unit may include means for inhibiting the indication of confirmation.

DETAILED DESCRIPTION OF THE PREFERRED EMBODIMENT

Now, the embodiment of the present invention will be described in detail with reference to the accompanying drawings. In the description the same or similar reference symbol is used to designate the same or similar element for brevity's sake.

Figure 1:
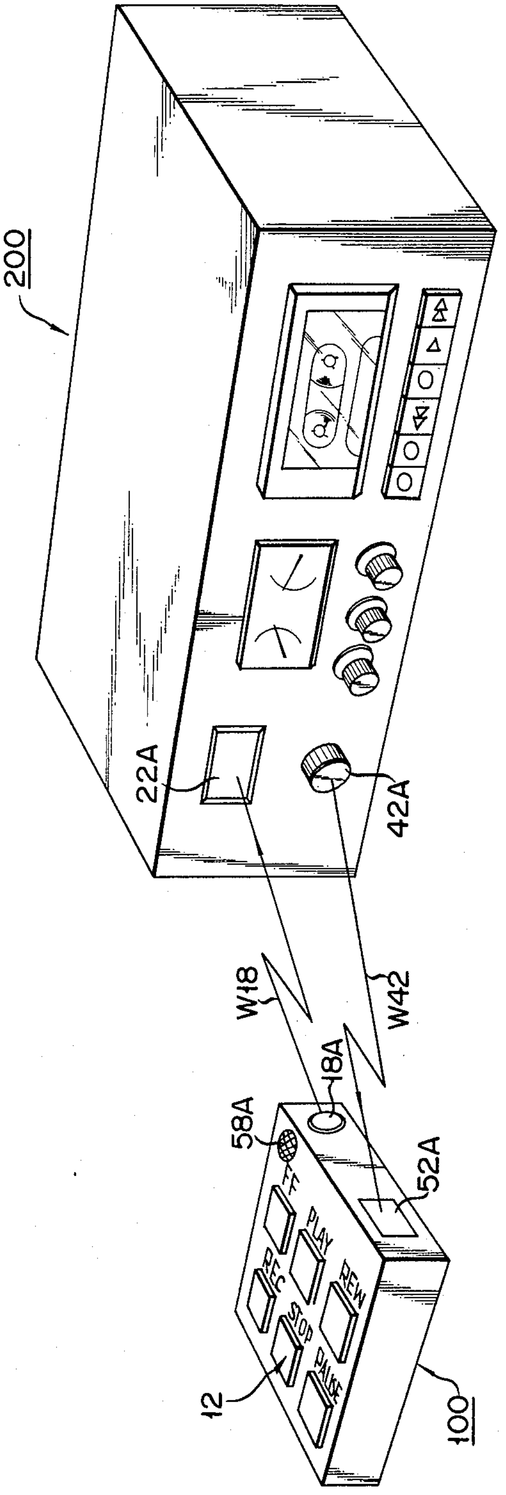
FIG. 1. illustrates a perspective view showing a main body 200 containing a controlled portion and a control unit 100 cordlessly or wirelessly coupled to the controlled portion of the main body.

In FIG. 1, there are shown a cassette tape deck (main body) 200 and a handy size remote control unit 100. Unit 100 is provided with an instruction keyboard 12 which designates the actuation mode of fast forward (FF), playback (PLAY), rewind (REW), stop (STOP), or pause (PAUSE). When the PLAY key of keyboard 12 is depressed by a user, an instruction wave W18 designating the playback mode is emitted from an output port 18A. Wave W18 is transmitted from output port 18A to an input port 22A of deck 200. Then the actuation mode of deck 200 is changed from, e.g., "STOP" to "PLAY" and deck 200 emits from an output port 42A a confirmation wave W42. Wave W42 is transmitted from output port 42A to an input port 52A of unit 100. When unit 100 receives wave W42, an indicator 58A of unit 100 brightens, thereby the user can confirm that the playback mode of deck 200 is exactly established. If indicator 58A does not brighten irrespective of the key manipulation of "PLAY", the user is noticed that the remote control fails to establish the playback mode in deck 200. Such failure may occur when ports 18A and 52A of unit 100 are not just directed towards ports 22A and 42A of deck 200. In this case the user should first correct the direction of ports 18A and 52A so that unit 100 will be cordlessly or wirelessly coupled to deck 200, and again depress the PLAY key. Then the actuation mode of deck 200 is changed to "PLAY" and indicator 58A brightens.

Figure 2:
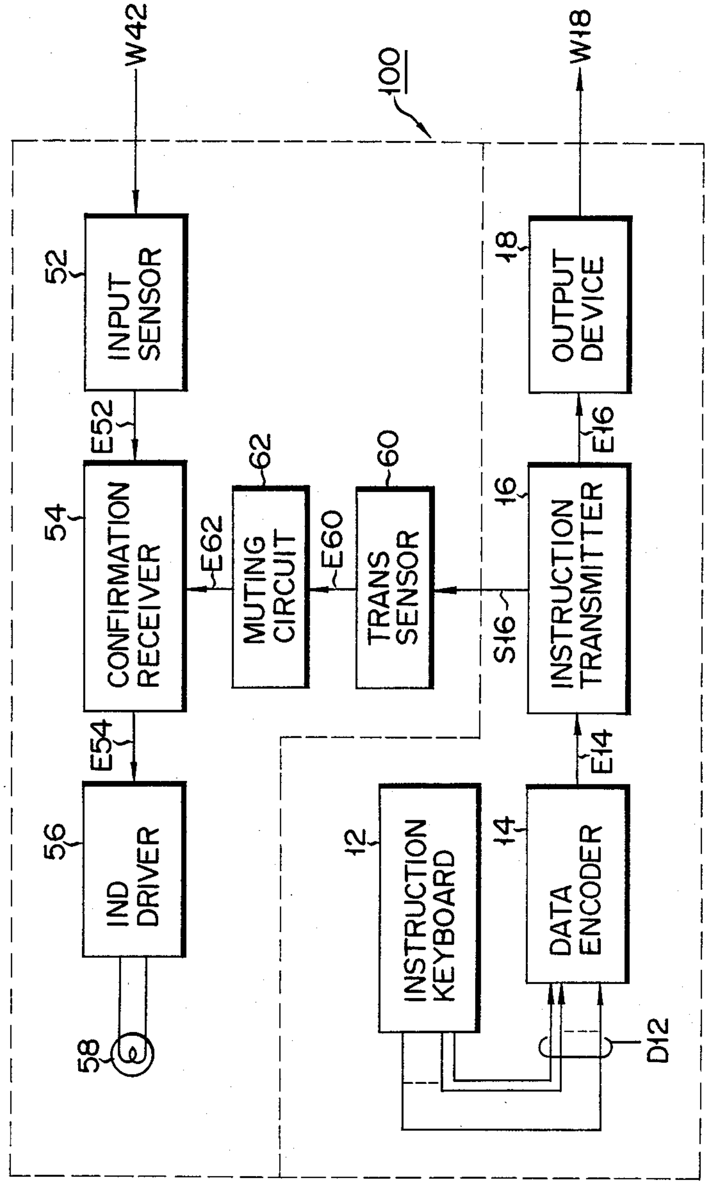
FIG. 2 shows a block diagram of the control unit 100 according to the present invention.
Figure 3:
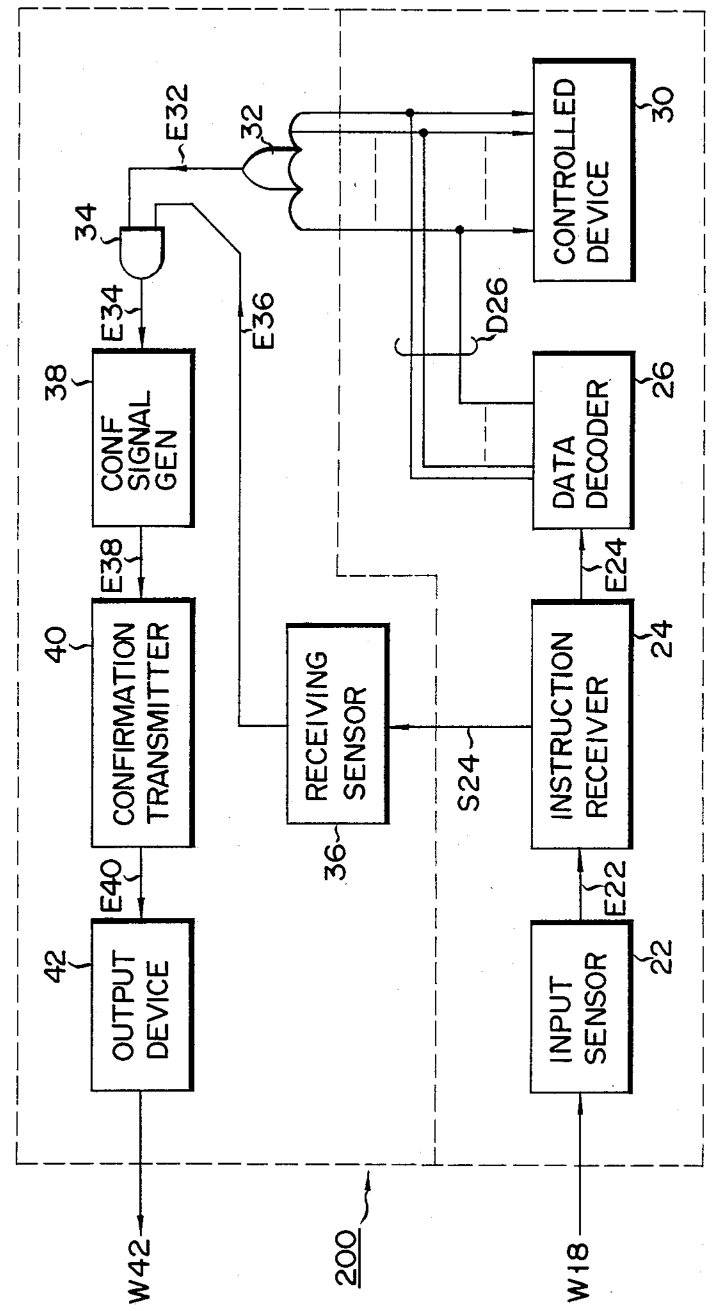
FIG. 3 shows a block diagram of the controlled portion (22–42) of the main body 200 according to the invention.

FIG. 2 and FIG. 3 respectively show the circuit configuration of control unit and that of controlled portion. In FIG. 2 each of actuation instructions D12 derived from an instruction keyboard 12 is applied to a data encoder 14. Encoder 14 encodes the applied instruction D12 to generate an instruction signal E14 being formed of a given pulse train which corresponds to the selected one of instructions D12. Signal E14 is applied to an instruction transmitter 16. Transmitter 16 provides an instruction output signal E16 and a transmission indication signal S16 which is generated only when signal E16 is generated. Signal E16 is applied to an output device 18. Where a light emission diode (LED) or a laser diode is used for device 18, it emits an instruction wave W18 of an electromagnetic wave having a very short wave length, e.g., a infrared ray. Wave W18 is transmitted to the tape deck 200.

When an input sensor 22 of FIG. 3 receives the wave W18, sensor 22 provides a sensed signal E22 corresponding to the signal E16. Sensor 22 may be a photo diode, CdS cell or the like. Signal E22 is applied to an instruction receiver 24. Receiver 24 provides a received instruction signal E24 and a receiving indication signal S24 which is generated only when signal E24 is generated. Signal E24 has a pulse train being identical with the pulse train of said signal E14. Signal E24 is applied to a data decoder 26. Decoder 26 decodes signal E24 and provides a controlled device 30 with a control command D26. Command D26 is formed of a plurality of control signals which are exactly corresponding to the actuation instructions D12. Thus, when device 18 is coupled via instruction wave W18 to sensor 22, decoder 26 outputs command D26 corresponding to instructions D12 so that device 30 is remotely controlled by the manipulation of keyboard 12.

Control signals of command D26 are applied to respective inputs of an OR gate 32. Gate 32 outputs a command confirming signal E32. Signal E32 is applied to one input of an AND gate 34. The other input of gate 34 receives a confirmation gate signal E36 derived from a receiving sensor 36. Sensor 36 generates signal E36 (E36="1") when the signal S24 disappears (S24="0"). Gate 34 permits signal E32 to pass therethrough when signal E36 has a logical "1" level, and outputs a trigger signal E34. Signal E34 is applied to a confirmation signal generator 38. Generator 38 is triggered by the leading edge of signal E34. Just after the triggering, generator 38 generates a confirmation signal E38 for a given period of time, e.g., 2 or 3 seconds. Signal E38 is applied to a confirmation transmitter 40. Transmitter 40 provides an output device 42 with a confirmation output signal E40. Device 42 may be a high intensity type LED which emits a confirmation wave W42 of infrared light during the generation of signal E38. Wave W42 is transmitted to the control unit 100.

When an input sensor 52 (FIG. 2) receives the wave W42, sensor 52 provides a sensed signal E52. Sensor 52 used here may be a photo diode or photo transistor. Signal E52 is applied to a confirmation receiver 54. Applied also to receiver 54 is a muting signal E62 derived from a muting circuit 62. Circuit 62 generates signal E62 upon receipt of a muting instruction E60. Instruction E60 is obtained from a transmission sensor 60 at the time when sensor 60 receives aforementioned transmission indication signal S16. Receiver 54 is rendered inactive when signal E62 is generated. When signal E62 disappears, receiver 54 amplifies signal E52 and outputs a confirmation output signal E54. Signal E54 is applied to an indication driver 56, and driver 56 excites an indicator lamp 58 according to signal E54. Then, lamp 58 illuminates the indicator 58A of FIG. 1.

Figure 4:
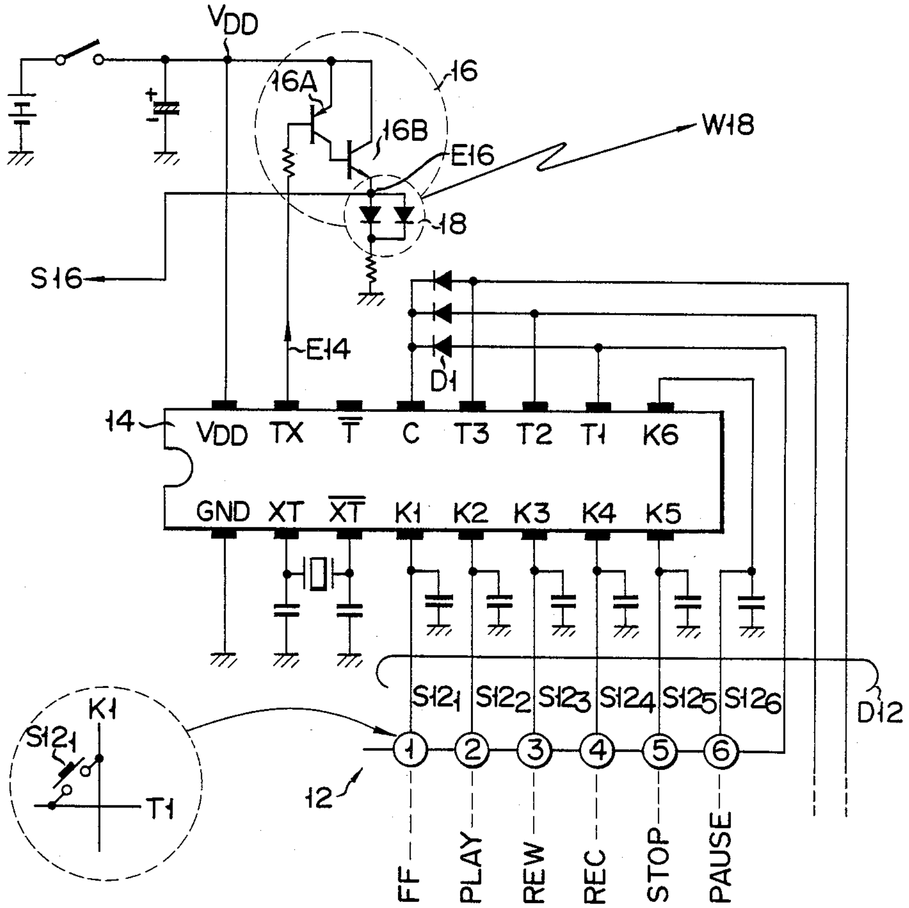
FIG. 4 shows a concrete embodiment of the elements 12–18 shown in FIG. 2.

FIG. 4 shows an embodiment of the elements 12–18 shown in FIG. 2. Switches $S12_1$–$S12_6$ of keyboard 12 are coupled to terminals K1–K6 of encoder 14, respectively. The common wiring of switches $S12_1$–$S12_6$ is coupled to a terminal T1 and to a terminal C via a diode D1. If keyboard 12 is equipped with 6×3 keys, the common wiring for the second six switches is coupled to terminals T2 and C, and the common wiring for the third six switches is coupled to terminals T3 and C. In this case encoder 14 can provide eighteen kinds of control instructions. Twelve switches coupled to terminals T2 and T3 are, however, omitted from FIGS. 1 and 4 for brevity. Terminals XT and $\overline{XT}$ are coupled with a ceramic vibrator element of, e.g., 455 kHz. A power supply voltage $V_{DD}$ is applied to a terminal $V_{DD}$ of encoder 14. An output terminal TX of encoder 14 is coupled via a resistor to the base of a PNP transistor 16A. The emitter of transistor 16A receives voltage $V_{DD}$. The collector of transistor 16A is coupled to the base of an NPN transistor 16B. The collector of transistor 16B is coupled to the emitter of transistor 16A and the emitter of transistor 16B is grounded via two parallel connected LED's 18 and via a resistor. The emitter current of transistor 16B energizes LED's 18. The transmission indication signal S16 may be obtained from the emitter of transistor 16B.

Figure 5:
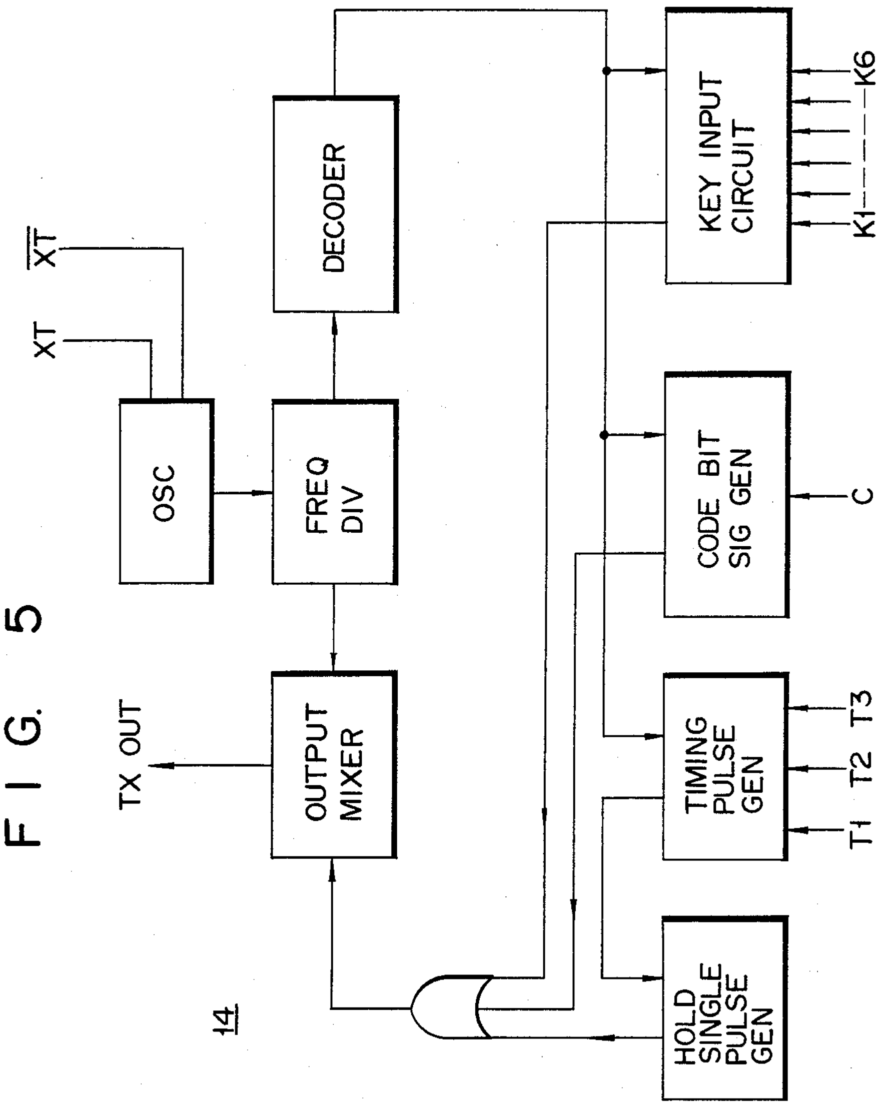
FIG. 5 shows details of an integration circuit device used for the data encoder 14 shown in FIG. 4.

In the embodiment of FIG. 4 the encoder 14 may be a commercially available integration circuit device having a configuration as shown in FIG. 5. One example for such device is a model TC9148P manufactured by TOSHIBA ELECTRIC CO., JAPAN. Since the configuration of FIG. 5 is conventional, details as to FIG. 5 will be omitted. In brief the device of FIG. 5 (TC9148P) generates a 12 bits pulse train whose pulse arrangement is corresponding to the input applied to a key input circuit. The 12 bits pulse train constitutes one cycle of a control instruction and is modulated by a 38 kHz carrier at an output mixer.

Figure 6:
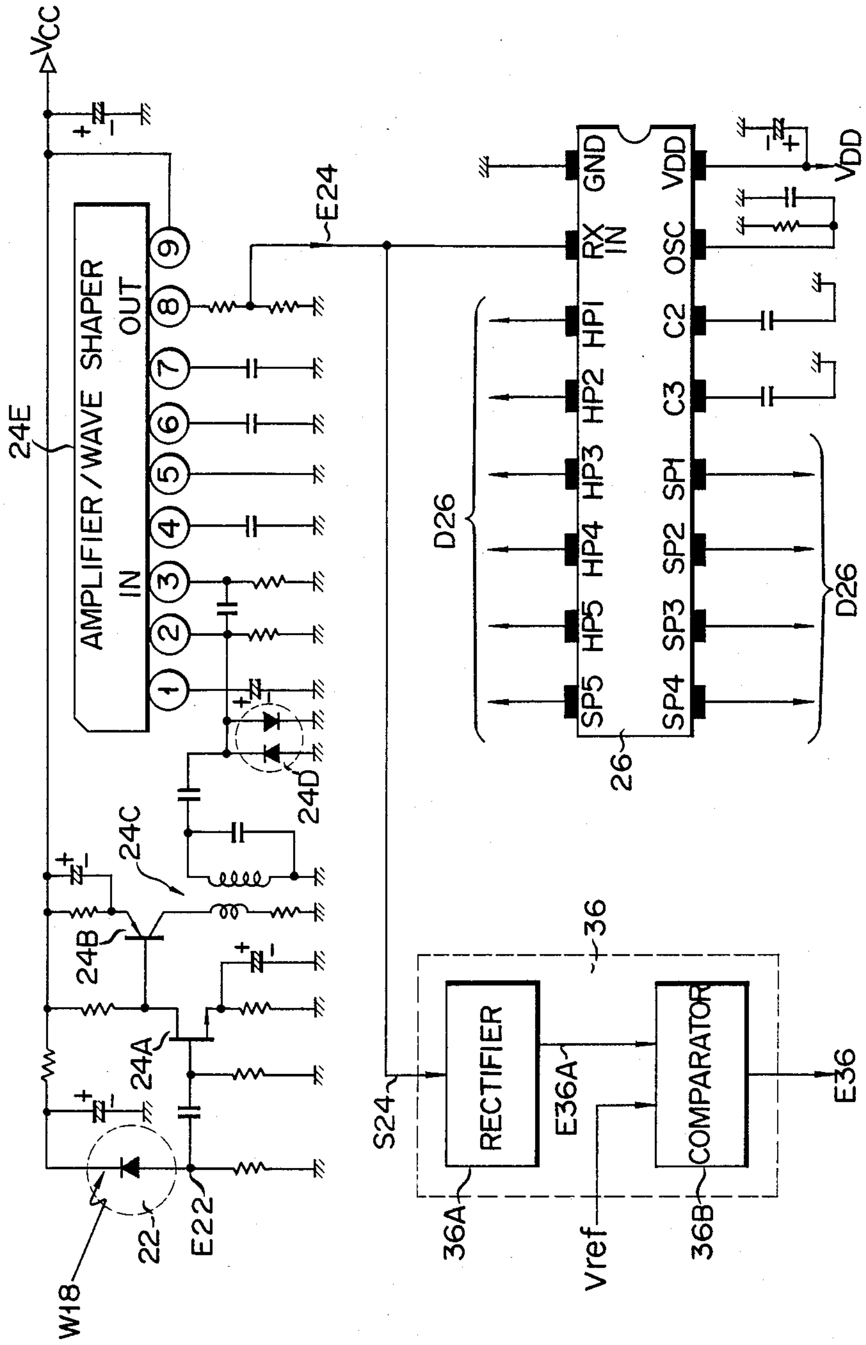
FIG. 6 shows a concrete embodiment of the elements 22–26 and 36 shown in FIG. 3.

FIG. 6 shows an embodiment of the elements 22–26 shown in FIG. 3. The instruction wave W18 is inputted to a photo diode 22. Diode 22 provides at its anode a potential change corresponding to the change of intensity of wave W18 applied to diode 22. This potential change is the sensed signal E22. Signal E22 is applied to the gate of an Nch FET 24A via a high-pass filter of CR type. FET 24A forms a source-grounded type amplifier. A drain output of FET 24A is applied to the base of a PNP transistor 24B. Transistor 24B forms an emitter-grounded type amplifier. The collector of transistor 24B is coupled with an LC tuning circuit or a tank circuit 24C whose resonance frequency is selected to, e.g., 38 kHz when a 38 kHz carrier is utilized in the encoder 14. A tuned signal obtained from circuit 24C is inputted via a cross-coupled diode limitter circuit 24D to an amplifier unit 24E which includes a wave shaper circuit such as a Schmitt trigger. Amplifier 24E may be a commercially available integration circuit device such as a model TA7344P manufactured by TOSHIBA ELECTRIC CO. Amplifer 24E outputs the received instruction signal E24 which has the same pulse train as that of said instruction signal E14.

Figure 7:
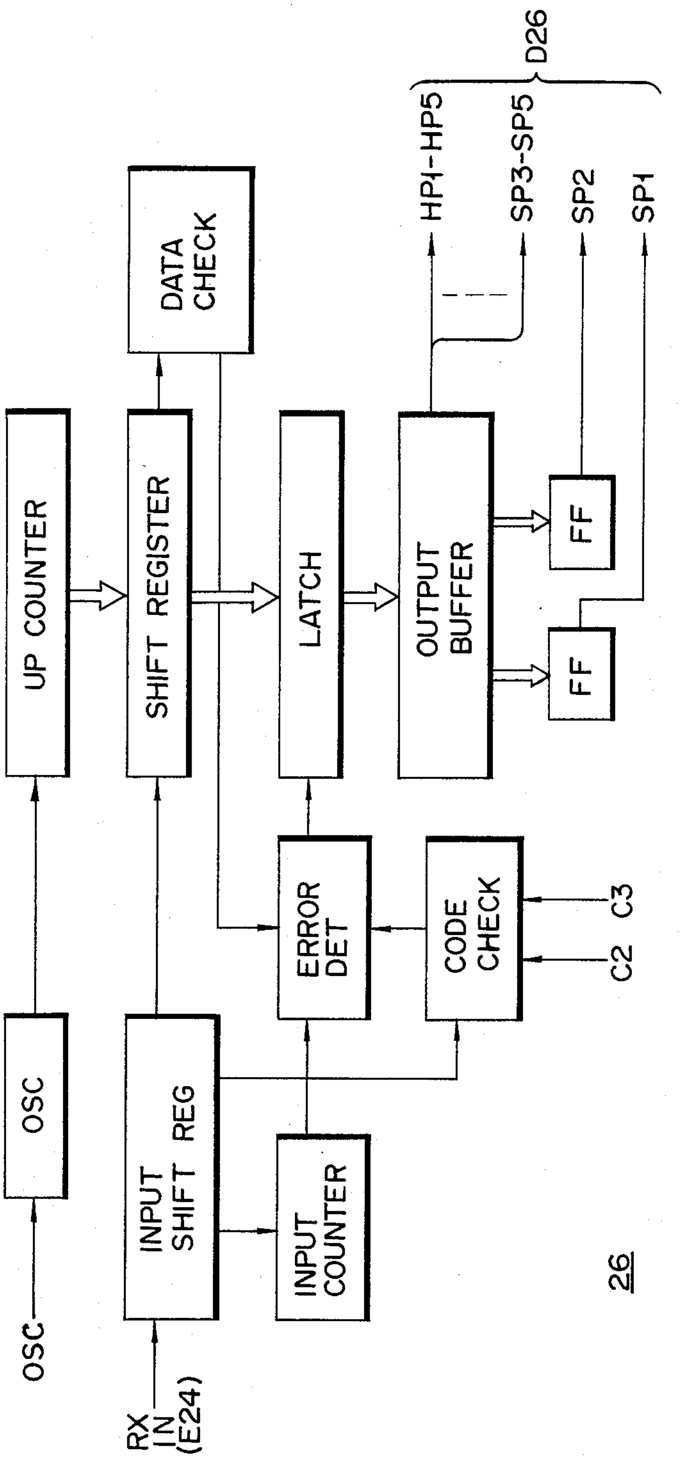
FIG. 7 shows details of an integration circuit device used for a data decoder 26 shown in FIG. 6.

Signal E24 is applied to an input terminal RX of decoder 26. Decoder 26 decodes the pulse train (serial data) of signal E24 and outputs the control command D26. Decoder 26 may be a commercially available integration circuit device having a configuration as shown in FIG. 7. One example for such device is a model TC9149P manufactured by TOSHIBA ELECTRIC CO. In FIG. 6 embodiment, command D26 consists of ten control signals which are obtained from terminals SP1–SP5 and HP1–HP5. If eighteen control signals are necessary, a model TC9150P (TOSHIBA ELECTRIC CO.) is appropriate for the decoder 26. Since the configuration of FIG. 7 is conventional, details as to FIG. 7 will be omitted. In brief, the device of FIG. 7 stores at respective shift registers the pulse train of signal E24 being formed of 12 bits per one cycle, checks code errors and data errors of the stored pulses, and then outputs the control signals of command D26.

The contents of command D26, i.e. six control signals selected from terminals SP1–SP5 and HP1–HP5 of decoder 26, are respectively corresponding to the control instructions of key switches $S12_1$–$S12_6$ (FIG. 4). For instance, when the key of switch $S12_2$ (FIG. 4) is depressed, terminals SP2 of decoder 26 (FIG. 6) provides a control signal having a logical level of "1" for the playback mode, and when the key of switch $S12_5$ is depressed, terminal SP5 provides a control signal being logical "1" for the stop mode while terminals SP2 becomes logical "0".

Signal E24 is also applied to a rectifier 36A as the signal S24. Rectifier 36A generates a rectified output signal E36A having a substantial DC potential when the pulse of signal S24 is applied thereto. Signal E36A is applied to a comparator 36B which also receives a reference voltage potential Vref. Comparator 36B generates the confirmation gate signal E36 when the voltage potential of signal E36A falls below the potential Vref, i.e. signal S24 disappears.

Figure 8:
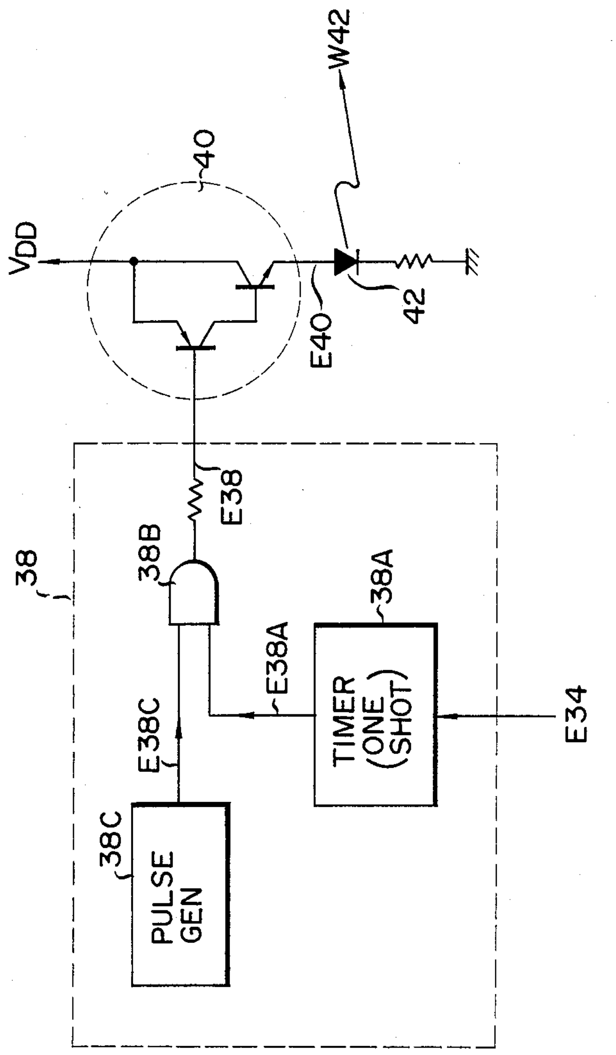
FIG. 8 shows a concrete embodiment of a confirmation signal generator 38 of the controlled portion shown in FIG. 3.

FIG. 8 shows an embodiment of the confirmation signal generator 38. Trigger signal E34 triggers a timer 38A. After the triggering, timer 38A generates a timer signal E38A for a given period of time, e.g., 2 or 3 seconds. Timer 38A may be a one-shot multivibrator triggered by the leading edge of signal E34, or a timer counter for generating signal E38A which starts to count clock pulses upon receipt of signal E34 and ends the count operation when the given number of count is completed.

Signal E38A is applied to one input of an AND gate 38B. The other input of gate 38B receives a confirmation pulse E38C which is derived from a pulse generator 38C. Gate 38B outputs the confirmation signal E38 having the same frequency as the pulse E38C only when signal E38A is generated. Signal E38 is power-energized by transmitter 40, and the energized signal E40 excites LED 42.

Figures 9, 9A, 9B:
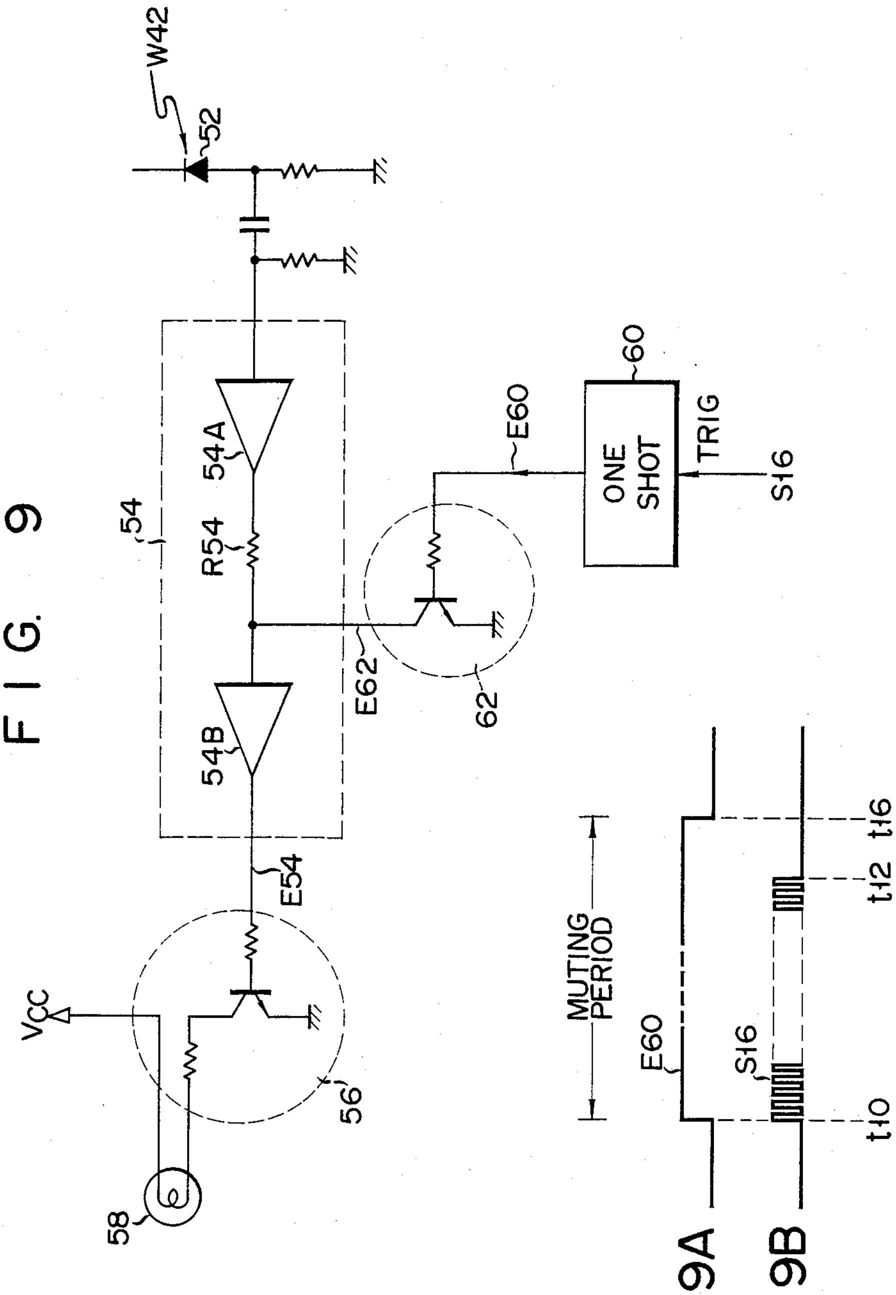
FIG. 9 shows a concrete embodiment of the elements 52–62 shown in FIG. 2.
FIGS. 9A and 9B show timing charts for explaining the operation of the one shot 60 of FIG. 9.

FIG. 9 shows an embodiment of the elements 52–62 shown in FIG. 2. A photo diode 52 receives the confirmation wave W42. Diode 52 provides at its anode a potential change corresponding to the change of intensity of wave W42. This potential change is the sensed signal E52. Signal E52 is inputted to a first amplifier 54A via a CR high-pass filter. The output terminal of amplifier 54A is coupled via a resistor R54 to the input terminal of a second amplifier 54B. Amplifier 54B provides the confirmation output signal E54. Signal E54 is current-amplified by driver 56 being formed of an emitter-grounded type transistor current booster. Thus, the lamp 58 is brightened when signal E54 becomes high voltage potential.

The input terminal of amplifier 54B is grounded via the collector-emitter path of an NPN transistor 62. The base of transistor 62 receives the muting instruction E60. Instruction E60 is obtained from a one-shot multivibrator 60. Transistor 62 is used for the muting circuit 62, and one-shot 60 forms the transmission sensor 60.

When one-shot 60 is triggered by the first one of transmission indication signal S16, instruction E60 becomes logical "1" (FIGS. 9A and 9B; t10). Instruction E60 retains logical "1" level so long as signal S16 continues to trigger the one-shot 60. When the transmission of instruction wave W18 ceases, signal S16 disappears (FIG. 9B; t12). Then, one-shot 60 is no longer triggered. When a given period of time being determined by the time constant of one-shot 60 has elapsed, instruction E60 returns to logical "0" (FIG. 9A; t14). The interval between time t12 and time t14 of FIGS. 9A and 9B may correspond to several pulses of signal S16.

Figure 10:
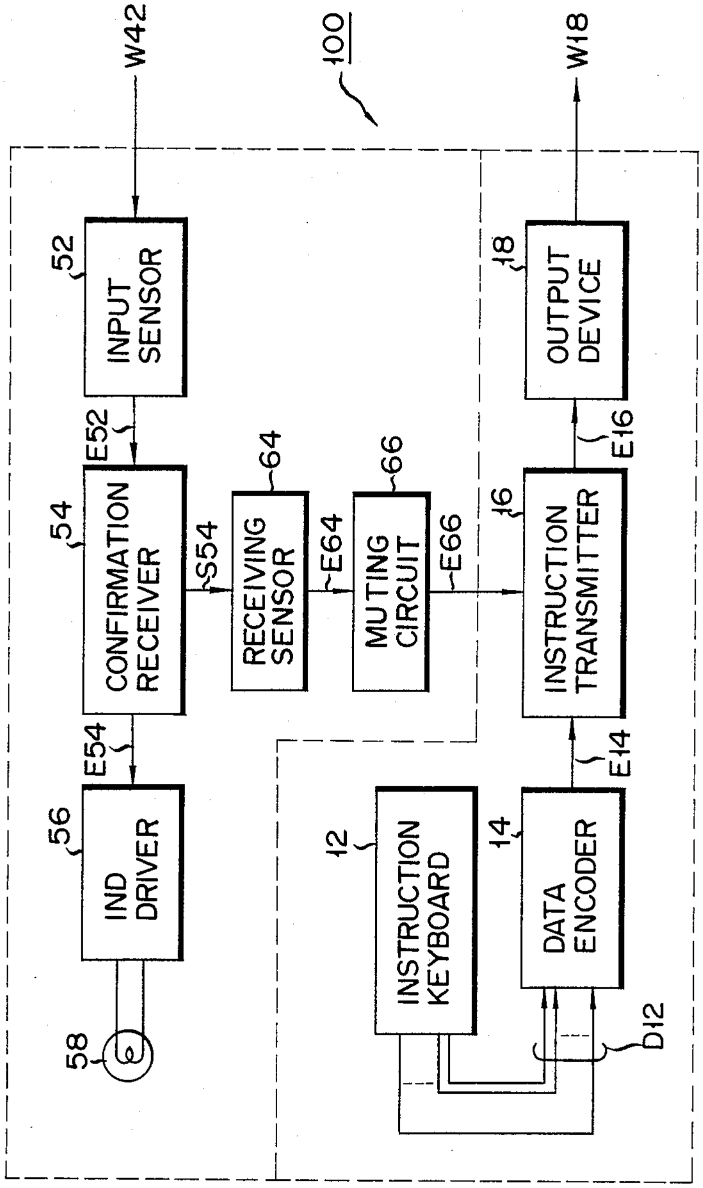
FIG. 10 shows another configuration of the control unit 100 shown in FIG. 1.

FIG. 10 shows the modification of the configuration of FIG. 2. In FIG. 2 the indication by lamp 58 is inhibited during the transmission of instruction wave W18 while, in FIG. 10, the transmission of wave W18 is prohibited when the indication by lamp 58 is carried out. Thus, confirmation receiver 54 provides a confirmation indication signal S54. Signal S54 is applied to a receiving sensor 64. Sensor 64 generates a muting instruction E64 upon receipt of signal S54. Instruction E64 is applied to a muting circuit 66. Circuit 66 generates a muting signal E66 when instruction E64 is applied. Circuit 66 provides the instruction transmitter 16 with signal E66 so that transmitter 16 is rendered inactive when the confirmation indication signal S54 is provided.

Figure 11:
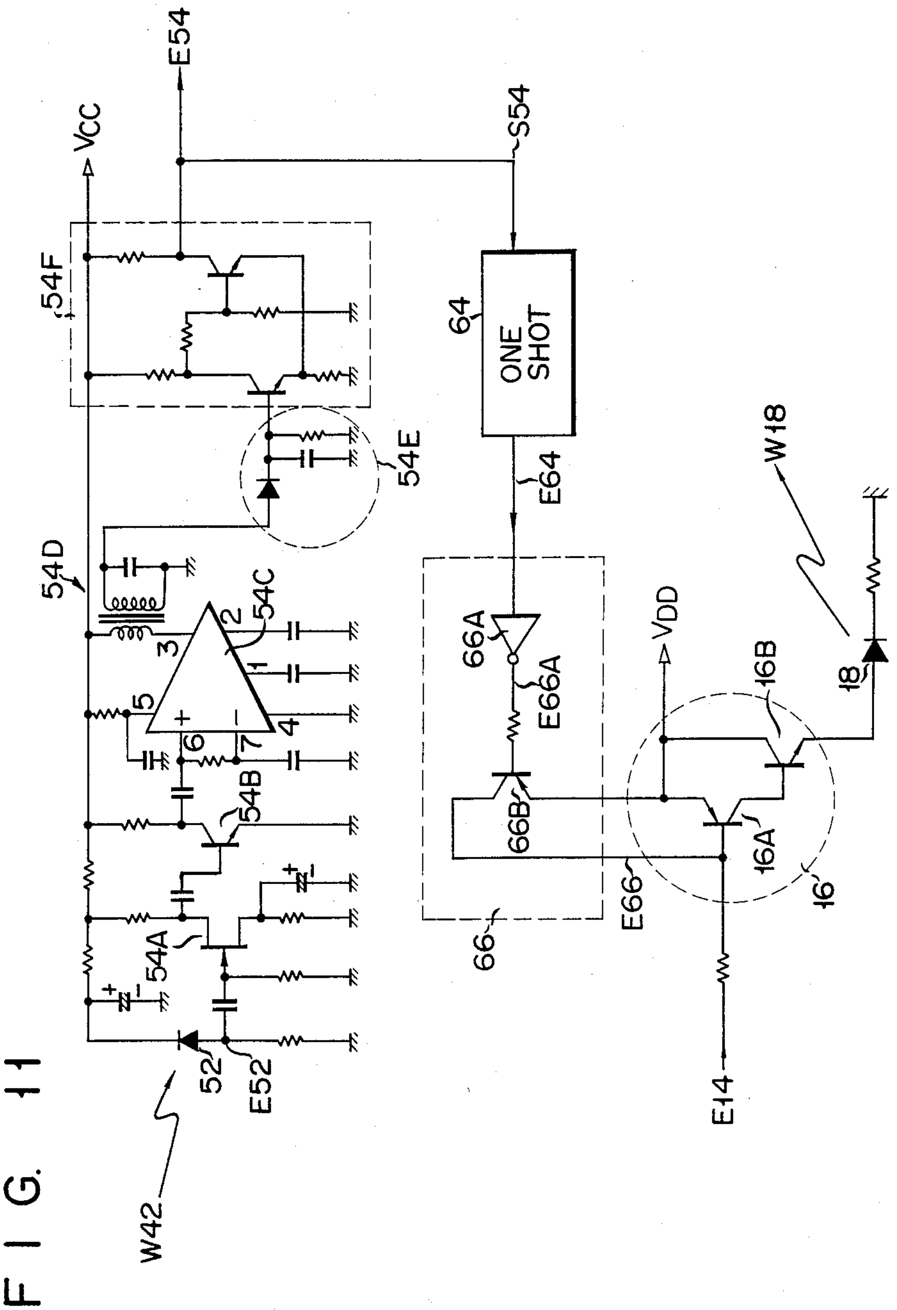
FIG. 11 shows a concrete embodiment of the elements 52–66 shown in FIG. 10.

FIG. 11 shows an embodiment of the elements 52–66 shown in FIG. 10. The confirmation wave W42 is inputted to a photo diode 52. Diode 52 provides at its anode a potential change corresponding to the change of intensity of wave W42. The potential change is the sensed signal E52 which is applied via a CR high-pass filter to the gate of an Nch FET 54A. FET 54A constitutes a source-grounded type amplifier. A drain output of FET 54A is applied to the base of an NPN transistor 54B. Transistor 54B forms an emitter-grounded type amplifier. The collector output of transistor 54B is applied to the noninverted input (6) of an linear amplifier 54C which has an open collector output terminal (3). The open collector output of amplifier 54C is coupled with a tank circuit 54D. A model TA7061AP manufactured by TOSHIBA ELECTRIC CO. or the corresponding linear IC may be used for the amplifier 54C. A tuned signal obtained from circuit 54D is inputted via a rectifier circuit 54E to the input of a Schmitt trigger circuit 54F of emitter-coupled type. Circuit 54F outputs the confirmation output signal E54 when the DC potential of rectified output of rectifier 54E exceeds the input threshold of the Schmitt trigger 54F.

Incidentally the circuit configuration of elements 54A–54F is exchangeable for that of elements 24A–24E of FIG. 6.

Signal E54 triggers a one-shot multivibrator 64. One-shot 64 generates the muting instruction E64 having logical "1" level so long as signal E54 continues to trigger the one-shot 64. The operation of one-shot 64 is basically identical with that of one-shot 60 of FIG. 9. The level of instruction E64 is inverted by an inverter 66A, and an inverted signal E66A outputted from inverter 66A is applied to the base of a PNP transistor 66B. The emitter and collector of transistor 66B are coupled to the emitter and base of a PNP transistor 16A of the transmitter 16. When signal S54 triggers the one-shot 64, it generates instruction E64 so that signal E66A becomes logical "0", thereby transistor 66B is rendered conductive. Where transistor 66B is conductive, since the base and emitter of transistor 16A is short-circuited, transistor 16A is inactive so that the transmission of the instruction wave W18 is prohibited.

Figure 12:
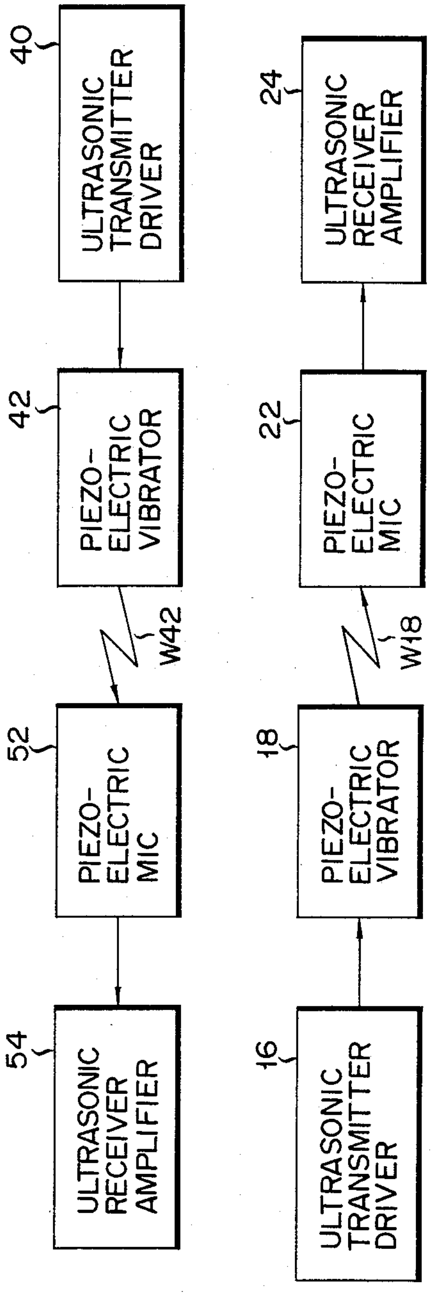
FIG. 12 shows another embodiment of the invention in which the control unit and the controlled portion are coupled with each other via ultrasonic waves.

FIG. 12 shows another embodiment of the invention wherein the control unit and the controlled portion are coupled via ultrasonic waves. Thus, a ultrasonic transmitter driver 16 excites a piezoelectric vibrator 18. Vibrator 18 generates a ultrasonic instruction wave W18 and transmits the wave W18 to a piezoelectric microphone 22. Microphone 22 senses wave W18 and an output of microphone 22 is amplified by a ultrasonic receiver amplifier 24. The signal treatment or signal processing for the output of amplifier 24 may be the same as in the case of FIGS. 2 and 3. When the remote control is established according to the instruction of wave W18, a ultrasonic transmitter driver 40 excites a piezoelectric vibrator 42 so that it generates a ultrasonic confirmation wave W42. Wave W42 is transmitted to a piezoelectric microphone 52. Microphone 52 senses wave W42 and an output of microphone 52 is amplified by a ultrasonic receiver amplifier 54. The output of amplifier 54 is used for indicating the confirmation of establishment of the remote control.

Although specific configurations have been illustrated and described herein, it is not intended that the invention be limited to the elements and configurations disclosed. Skilled person in the art will recognize that particular elements or subconfigurations may be used without departing from the scope of the claimed invention. For instance, the output device 18 or 42 may be a combination of a lamp or its equivalent and a chopper for chopping the continuous light of the lamp to generate a pulsate light, and the pulsate light may be used for the instruction or confirmation wave. The input sensor 22 or 52 may be a photomultiplier. When one coupling pair of the elements 18, 22, 42 and 52 utilizes an electromagnetic wave inclusive of a radio wave and light, the other coupling pair may utilize sonic wave inclusive of audible and ultrasonic waves.

Further, in order to lessen the interference between the instruction wave W18 and the confirmation wave W42, it is preferable to use different waves for the instruction and confirmation waves. To be concrete, the wave length of instruction wave W18 is selected to be different from that of confirmation wave W42, or, the frequency of wave W18 has no harmonic relation with that of wave W42.

What we claim is:

1. A cordless remote control arrangement for controlling a device, comprising:

a portable control unit including:

instruction means for generating an instruction wave and wirelessly transmitting it, said instruction wave including information for controlling said device, and means for receiving a confirmation wave and indicating in response thereto that said device has been controlled in accordance with said instruction wave; and a main body containing said device and having a controlled portion, said controlled portion including:

means for receiving said instruction wave and generating a first signal when said device has been controlled in accordance with said instruction wave, said instruction wave receiving means including means responsive to said instruction wave for generating a second signal only when said controlled portion is coupled to said control unit via said instruction wave and providing said device with a control command corresponding to the contents of said instruction wave, said control command directing the actuation of said device, and means for generating said first signal when said second signal disappears and said control command is provided, thereby avoiding overlapping between the instruction wave and the confirmation wave, and means, coupled to said instruction wave receiving means, for generating, in response to said first signal, a confirmation wave for a given period of time after the generation of said first signal.

2. The apparatus of claim 1, wherein said confirmation wave has a given duration sufficient to indicate the establishment of control of said device, and said confirmation wave generating means generates said confirmation wave each time said first signal is generated.

3. The apparatus of claim 2, wherein said confirmation wave receiving and indicating means includes:

means coupled to said instruction means for, when said instruction means generates said instruction wave, inhibiting the indication of confirmation that the given actuation of said device is established.

4. The apparatus of claim 2, wherein said confirmation wave receiving and indicating means includes:

means, coupled to said instruction means, for prohibiting the transmission of said instruction wave upon receipt of said confirmation wave.

5. The apparatus of claim 2, wherein there are two different waves for wirelessly coupling said control unit with said controlled portion, one of said waves being utilized for transmitting said instruction wave, and the other of said waves being utilized for transmitting said confirmation wave.

6. The apparatus of claim 1, wherein said confirmation wave generating means includes:

means, triggerable by said first signal, for generating a third signal for said given period of time after being triggered by said first signal; and means coupled to said third signal generating means for generating said confirmation wave upon receipt of said third signal.

7. The apparatus of claim 6, wherein said confirmation wave receiving and indicating means includes:
means coupled to said instruction means for, when said instruction means generates said instruction wave, inhibiting the indication of confirmation that the given actuation of said device is established.

8. The apparatus of claim 6, wherein said confirmation wave receiving and indicating means includes:
means, coupled to said instruction means, for prohibiting the transmission of said instruction wave upon receipt of said confirmation wave.

9. The apparatus of claim 6, wherein there are two different waves for wirelessly coupling said control unit with said controlled portion, one of said waves being utilized for transmitting said instruction wave, and the other of said waves being utilized for transmitting said confirmation wave.

10. The apparatus of claim 1, wherein said confirmation wave receiving and indicating means includes:
means, coupled to said instruction means for, when said instruction means generates said instruction wave, inhibiting the indication of confirmation that the given actuation of said device is established.

11. The apparatus of claim 10, wherein there are two different waves for wirelessly coupling said control unit with said controlled portion, one of said waves being utilized for transmitting said instruction wave, and the other of said wave being utilized for transmitting said confirmation wave.

12. The apparatus of claim 3, wherein there are two different waves for wirelessly coupling said control unit with said controlled portion, one of said waves being utilized for transmitting said instruction wave, and the other of said waves being utilized for transmitting said confirmation wave.

13. The apparatus of claim 1, wherein said confirmation wave receiving and indicating means includes:
means, coupled to said instruction means, for prohibiting the transmission of said instruction wave upon receipt of said confirmation wave.

14. The apparatus of claim 1, wherein there are two different waves for wirelessly coupling said control unit with said controlled portion, one of said waves being utilized for transmitting said instruction wave, and the other of said waves being utilized for transmitting said confirmation wave.

15. The apparatus of claim 14, wherein one of said waves is a first electromagnetic wave and the other of said waves is a second electromagnetic wave of which wave length is different from that of said first electromagnetic wave.

16. The apparatus of claim 14, wherein one of said waves is a first sonic wave and the other of said waves is a second sonic wave of which vibration frequency has no harmonic relation with that of said first sonic wave.

17. The apparatus of claim 14, wherein one of said waves is an electromagnetic wave and the other of said waves is a sonic wave.

18. The apparatus of claim 14, wherein one of said waves is a sonic wave and the other of said waves is an electromagnetic wave.

19. A cordless remote control arrangement for controlling a device, comprising:
a portable unit including:
instruction transmitter means for generating and cordless transmitting an instruction wave carrying device control information, and
confirmation receiver means for receiving a confirmation wave and indicating in response thereto that said device has been controlled in response to said instruction wave; and
a main body containing said device and having a controlled portion, said controlled portion including:
instruction receiver means for receiving said instruction wave and generating in response thereto a receiving indication signal when said instruction receiver means is receiving said instruction wave, and providing to said device a control command corresponding to the information of said instruction wave, said control command determining the control of said device; and
confirmation transmitter means for generating in response to said receiving indication signal a confirmation wave for a given period of time after said receiving indication signal disappears and said control command is generated, thereby avoiding overlapping of said instruction wave and confirmation wave, said confirmation transmitter including:
trigger means, responsive to said receiving indication signal and said control command, for generating a trigger signal when said receiving indication signal disappears and said control command is generated;
timer means, coupled to said trigger means and being triggerable by said trigger signal, for generating a timer signal when said trigger signal triggers said timer means, the duration of said timer signal corresponding to said given period of time;
signal generator means, coupled to said timer means, for generating a confirmation signal only when said timer signal is generated; and
output means coupled to said signal generator means for providing said confirmation wave upon receipt of said confirmation signal.

20. The apparatus of claim 19, wherein said control unit further includes:
means coupled to said instruction transmitter means and to said confirmation receiver means for, when said instruction transmitter means generates said instruction wave, inhibiting the indication of confirmation that the actuation of said device is established.

21. The apparatus of claim 19, wherein said control unit further includes:
means coupled to said confirmation receiver means and to said instruction transmitter means for prohibiting the transmission of said instruction wave when said confirmation receiver means receives said confirmation wave.

* * * * *